US006773596B2

(12) United States Patent
Penzes et al.

(10) Patent No.: US 6,773,596 B2
(45) Date of Patent: Aug. 10, 2004

(54) ACTIVATED SLUDGE METHOD AND DEVICE FOR THE TREATMENT OF EFFLUENT WITH NITROGEN AND PHOSPHORUS REMOVAL

(76) Inventors: Ladislav Penzes, Bae 57, SK-93030 (SK); Juraj Csefalvay, Zahradnicka 30, SK-900 44 Tomasov (SK)

(*) Notice: Subject to any disclaimer, the term of this patent is extended or adjusted under 35 U.S.C. 154(b) by 0 days.

(21) Appl. No.: 10/343,518

(22) PCT Filed: Jul. 31, 2001

(86) PCT No.: PCT/IB01/01368
§ 371 (c)(1),
(2), (4) Date: Apr. 30, 2003

(87) PCT Pub. No.: WO02/12133
PCT Pub. Date: Feb. 14, 2002

(65) Prior Publication Data
US 2003/0183572 A1 Oct. 2, 2003

(30) Foreign Application Priority Data

Aug. 3, 2000 (SK) ........................................ 1176-2000
Aug. 3, 2000 (SK) ........................................ 251-2000 U

(51) Int. Cl.⁷ .............................. C02F 3/30; C02F 3/12
(52) U.S. Cl. ...................... 210/605; 210/623; 210/903; 210/906; 210/195.1; 210/260
(58) Field of Search ............................... 210/605, 621, 210/622, 623, 903, 906, 195.1, 252, 259, 260

(56) References Cited

U.S. PATENT DOCUMENTS 2,359,004 A * 9/1944 Schlenz et al. ............. 210/605
4,966,705 A * 10/1990 Jamieson et al. ........... 210/605
5,518,618 A * 5/1996 Mulder et al. ............... 210/605
6,096,214 A * 8/2000 Ripley ......................... 210/603
6,562,237 B1 * 5/2003 Olaopa ........................ 210/605
6,592,757 B2 * 7/2003 Nasr ......................... 210/195.1
6,620,322 B1 * 9/2003 Vesio et al. ................. 210/605

FOREIGN PATENT DOCUMENTS

| DE | 32 35 992 | 3/1984 |
| DE | 39 15 026 | 11/1989 |
| DE | 37 16 782 | 9/1992 |
| DE | 35 01 585 | 12/1992 |
| DE | 197 37 373 | 6/1998 |
| WO | 98/23542 | 6/1998 |

* cited by examiner

Primary Examiner—Fred G. Prince
(74) Attorney, Agent, or Firm—Pauley Petersen & Erickson

(57) ABSTRACT

A device and method for the treatment of effluent with activated sludge in suspension, for the removal of nitrogen and phosphorus and for simultaneous sludge stabilization. An activated chamber has a fermentation zone, a denitrification zone and a nitrification zone, whereby the fermentation zone and the denitrification zone in the activated chamber, are separated by scum boards and overflow barriers in the direction of flow, providing ascending flow and descending flow chambers in the anaerobic fermentation zone and the denitrification zone. A residence time and concentration of the activated sludge in the anaerobic fermentation zone, the denitrification zone, the nitrification zone and the settling tank may be controlled by changes to the intensity of recirculation of the effluent-sludge mixture in the anaerobic fermentation zone and recirculation of the recycled sludge to the denitrification zone, or by changing the continuous and short-term, intermittent operation of the recirculation within predetermined time intervals, to follow fixed temporal sequences, corresponding to the given time variations in effluent amount and loading.

14 Claims, 4 Drawing Sheets

ACTIVATED SLUDGE METHOD AND DEVICE FOR THE TREATMENT OF EFFLUENT WITH NITROGEN AND PHOSPHORUS REMOVAL

BACKGROUND OF THE INVENTION

1. Field of the Invention

This invention relates to a method for treatment of effluent with activated sludge in suspension for removal of nitrogen and phosphorus and for simultaneous stabilization of the sludge and to a continuously charged apparatus for the execution of this method. This invention also relates to an apparatus having a compact effluent treatment reactor, particularly for individual effluent disposal, in which an activated chamber and a settling tank are combined in one internal sludge cycle, and the activated chamber containing a non-ventilated anaerobic fermentation zone and a denitrification zone as well as a ventilated nitrification zone.

2. Discussion of Related Art

Various designs of small and very small activated-sludge plants have been developed for the treatment of locally accruing effluent from fairly small sources of water contamination. A substantial goal is to create a small, but powerful and economically viable plant, which can overcome enormously variable flows of volume and mass.

If systems for individual effluent disposal in rural regions form a real alternative to central treatment systems, they should guarantee a comparable treatment for the removal of nitrogen and phosphorus from the effluent, at similar operating costs as well offering simple operation.

To remove as much nitrogen as possible, it is necessary for the sludge load to be as small as possible. Attempts are made to work with as large as possible a quantity of activated sludge in aeration tanks. The known, relatively flat reactors of small effluent treatment plants do not allow for operation with very high concentrations of sludge. Where there are higher concentrations of activated sludge, the sludge level is increased in the settling tank; where this sludge is sucked-off in an intensive manner into a denitrification zone. However, there is also an increase in the undesired dissolved oxygen in this zone and the residence time of sludge under anoxic conditions is reduced.

The biological removal of phosphorus is often effected by an anaerobic zone in the activation chamber, and it is possible to increase the efficiency of this process by an anaerobic fermentation zone connected upstream. The phosphorus, which is bound in the activated sludge, is subsequently discharged together with surplus sludge in the oxic state. In the apparatuses known to date, phosphorus cannot be removed effectively in a biological manner, as the crude effluent, which is supplied to the small effluent treatment plants, has not been pre-fermented in the same way as the effluent originating from numerous sewer pipe networks, and as the existing reactors for the treatment of locally occurring effluent have no conditions for this type of fermentation.

In known effluent treatment systems, in which the activated sludge method is applied in continuously charged systems, the concentration of the activated sludge can be increased. Because of the danger of congestion or respectively because it is not possible to have a high degree of control of the treatment process, fixed bed systems frequently give rise to problems.

The crude effluent from small sources of water contamination contains many coarse substances and in the majority of cases is loaded with fat. The mechanical removal of coarse substances from the effluent is effected in the sewage trap, which frequently operates with ventilation, or large bubbles, however this only disintegrates a small portion of the sewage substances, particularly with respect to the short residence time of the effluent in this part of the reactor. Coarse sewage particles and organic substances which do not decompose easily, progress into other parts of the reactor and sometimes even progress into the discharge flow for treated water. In known reactors, the protection against the ingress of fat into the nitrification zone is not controlled, giving rise to a reduction in efficiency of the activation.

The cause of the sludge being washed-out and of the reduced effect of the treatment in the designs of the previously known reactors is, among other things, also the unsuitable admission of the activated mixture into the settling tank, which results in the formation of dead zones and uncontrolled turbulence in the settling tank. To avoid the negative influences of the oscillating, hydraulic load of the flat settling tank in the known reactors, the principle of so-called fluid filtration is used, according to which a specific level of sludge is assumed in the settling tank and thus an extensive reduction in the level of treated water in the settling tank. Under these conditions, where there is a lack of qualified operators, the treatment system tends to wash-out sludge and to reduce the efficiency of the treatment. The retaining of the old sludge as well as the high degree of efficiency of the treatment means that a high concentration of sludge can be achieved in the reactor, which is not possible in known reactors using liquid filtration. Uncontrolled denitrification with the sludge being washed-out into the treated water zone is caused by the longer residence time of the sludge in the settling tank with liquid filtration. At the same time, the efficiency of the treatment is lower, as the concentration of the dissolved oxygen in the settling tank is reduced. Even excessive ventilation of the nitrification zone results in the sludge being washed-out, as sludge particles are raised by adhering air bubbles. In the previously known reactors, the washing-out and de-gasification of sludge is frequently achieved by sucking it out at the level of the water-surface into the nitrification zone using air-lift pumps, giving rise to an increase in the hydraulic load of the setting tank and a reduction in the efficiency of the separation. Alternatively, a degasification container or respectively a zone with ventilation can be connected upstream of the settling tank, giving rise, however, to an increase in investment costs. There is also a technical solution according to which the water-surface in the settling tank is ventilated; however, this solution does not prevent the sludge being washed-out in a sufficient manner.

German Patent References DE-C2-3501585, DE-C2-3716-782, DE-A1-3915026 and DE-A1-19737373 and PCT International Publication WO 98/23542 make known methods for the treatment of effluent, where phosphorus or respectively nitrogen is removed from the effluent by activated sludge. The PCT International Publication WO 98/23542 discloses a method, where the concentration of phosphorus is measured at various points in the settling tank and the concentration of the re-circulated sludge, which is supplied to the primary water-sludge mixture or another anaerobic zone, is modified accordingly.

In addition, German Patent Reference DE-C2-3235992 discloses a system for biological treatment and denitrification of effluent with an aeration tank, which is divided into two or more chambers by adjustable partition walls extending at least approximately in the radial direction.

SUMMARY OF THE INVENTION

It is one object of this invention to provide a method and an apparatus for biological treatment of effluent with an activated sludge method with the removal of nitrogen and phosphorus while avoiding the identified disadvantages of the known art, the method and apparatus of this invention providing a treatment which is of a high level and is steady and requires minimum investment and operating costs.

This object is achieved through characteristics described in the claims and in this specification.

BRIEF DESCRIPTION OF THE DRAWINGS

This invention is discussed in view of the drawing, wherein.

DESCRIPTION OF PREFERRED EMBODIMENTS

Figure 1:
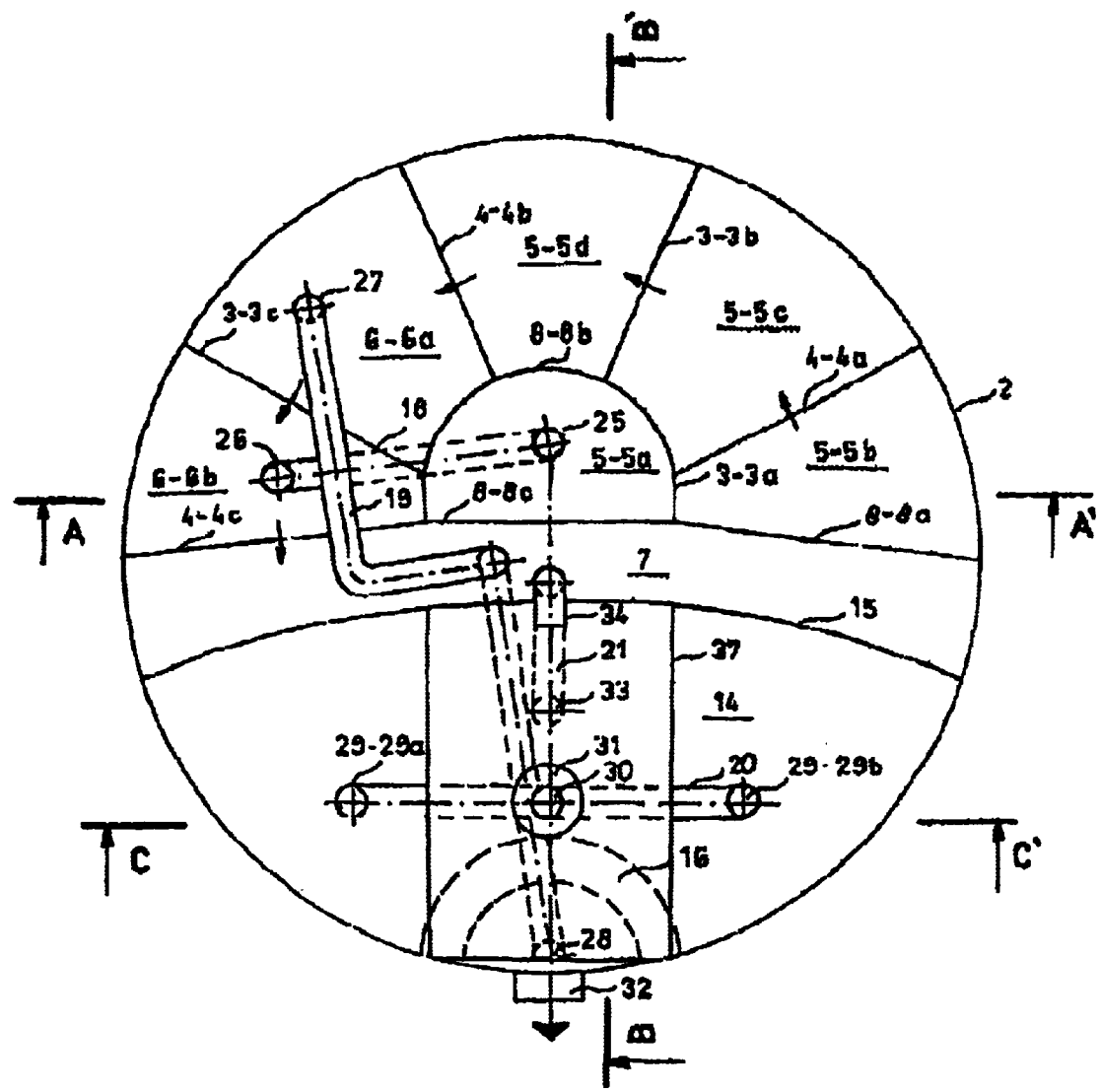
FIG. 1 is a top view of an effluent treatment reactor according to this invention.
Figure 2:
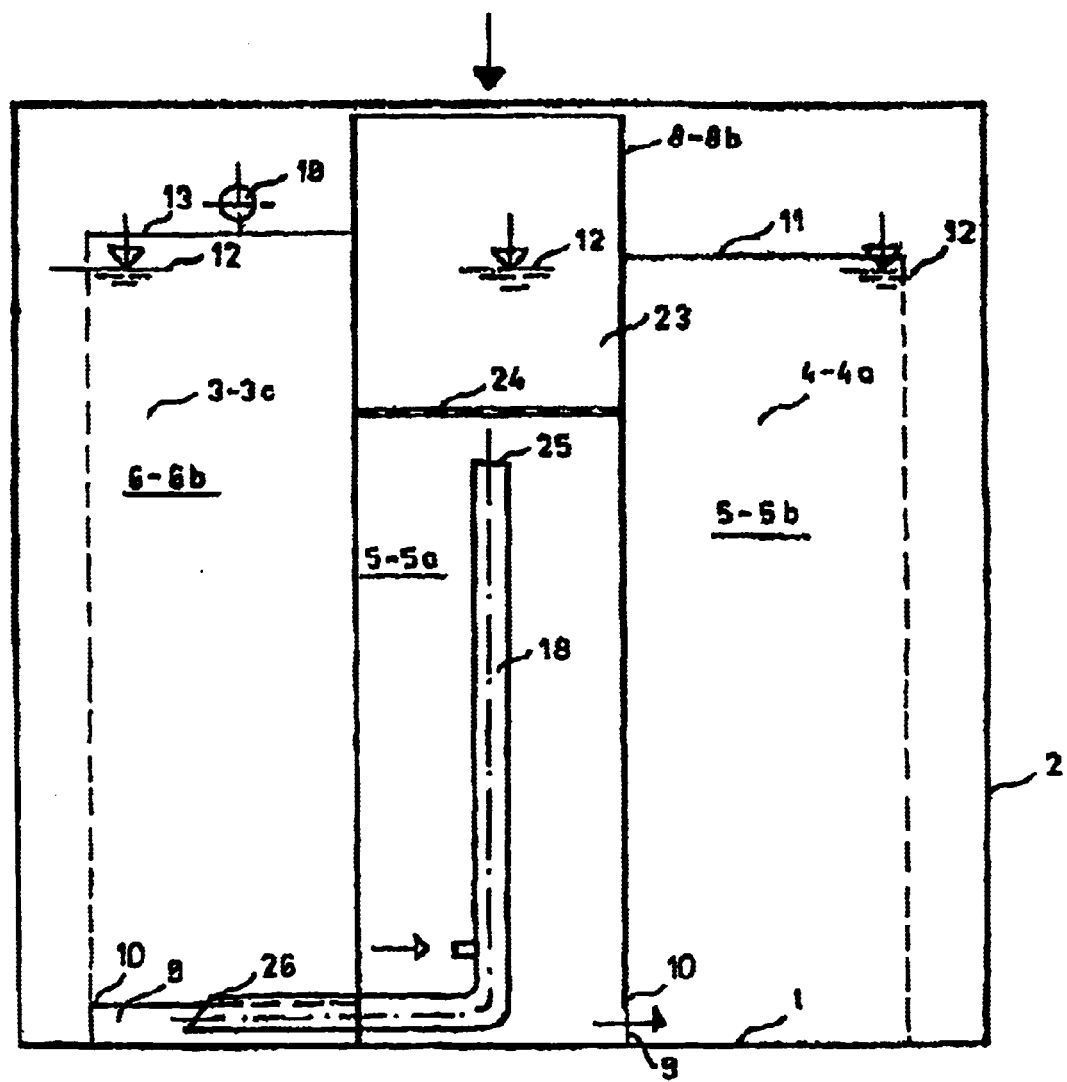
FIG. 2 is a section view according to the line A—A shown in FIG. 1.
Figure 3:
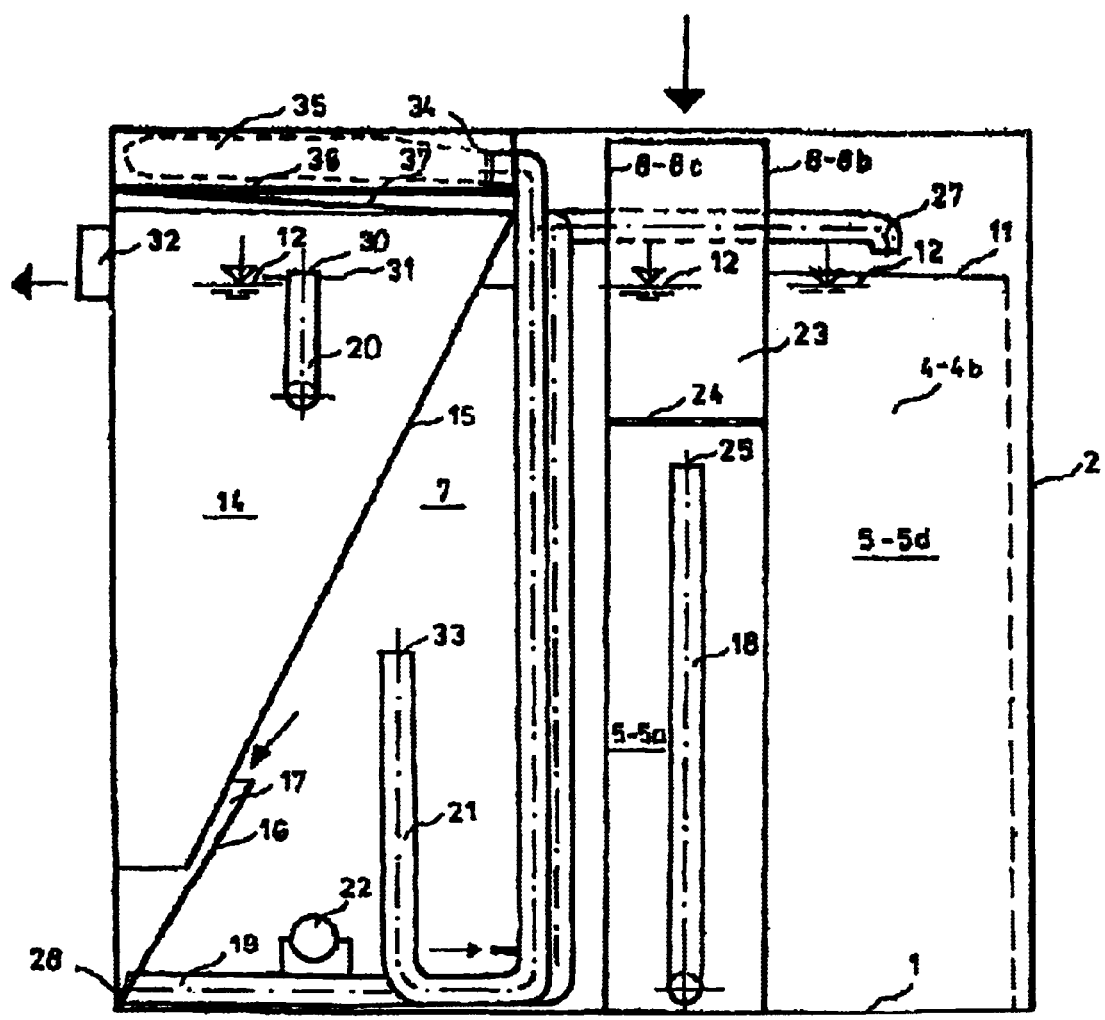
FIG. 3 is a section view according to the line B—B shown in FIG. 1.
Figure 4:
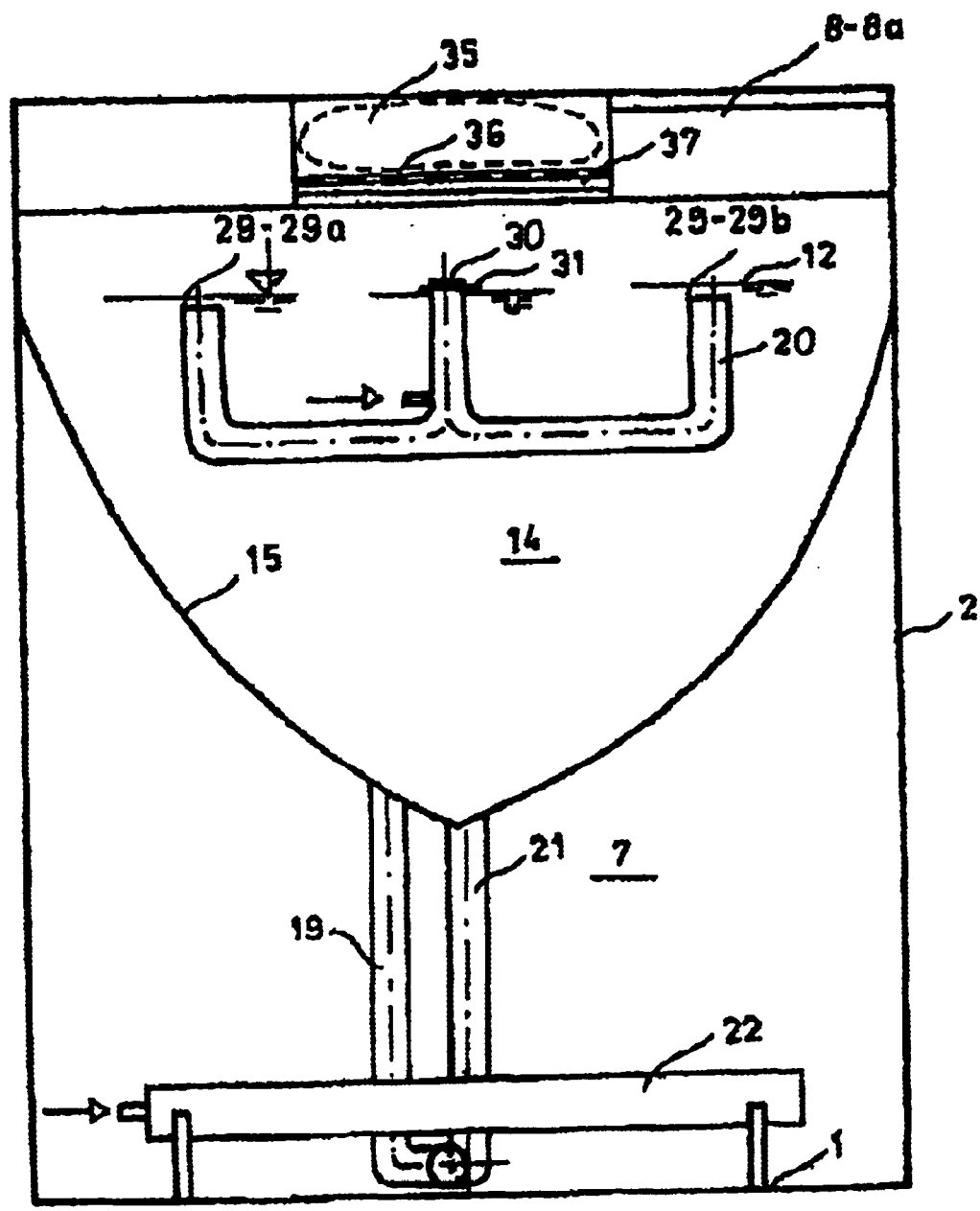
FIG. 4 is a section view according to the line C—C shown in FIG. 1.

The apparatus for a method for the treatment of effluent by activated sludge for the removal of nitrogen and phosphorus according to this invention comprises a cylinder-shaped effluent treatment reactor with a floor 1 and a shell 2. Non-ventilated zones of an activated chamber 5, 6 of the reactor are divided in an alternating manner in the direction of flow by scum boards 3 (identified in the Figures by 3-3a, 3-3b, 3-3c) and overflow barriers 4 (identified in the Figures by 4-4a, 4-4b, 4-4c), giving rise to ascending flow and descending flow chambers of an anaerobic fermentation zone 5 (identified in the Figures by 5-5a, 5-5b, 5-5c) and ascending flow and descending flow chambers of a denitrification zone 6 (identified in the Figures by 6-6a, 6-6b, 6-6c). A ventilated nitrification zone 7 is separated from the anaerobic fermentation zone 5 by a partition wall 8 (identified in the Figures by 8-8a, and 8-8c) and communicates with the denitrification zone 6 only in the direction of flow by the overflow barrier 4-4c. The scum boards 3 are accessible via an opening 9 (FIG. 2) between their lower edge 10 and the floor 1 along the entire wall width. The overflow barriers 4 are accessible via the overflow edge 11 along the entire wall width. The first chamber 5a of the anaerobic fermentation zone 5 is equipped with a collecting device for coarse substances in the effluent 23, which comprises a removable bar grate 24 and the partition walls 8b and 8c. Beneath the bar grate 24 there is a discharge aperture 25 of a conduit of the air-lift pump 18, the discharge aperture 25 lying below the water-surface, this conduit extending at right angles to the grate 24. The air-lift pump pumps the effluent-sludge mixture from the floor of the last chamber 6b of the denitrification zone 6 through a suction inlet 26. In the first chamber 6a of the denitrification zone 6, there is a discharge aperture 27 (FIG. 3) of the air-lift pump 19 with re-circulated recycled sludge, said discharge aperture 27 lying above the water-surface. The nitrification zone 7 of the activated chamber is separated from a settling tank 14 by two partition walls 15, 16, which partly overlap and are in the form of a truncated hemisphere, the settling tank 14 and activated chamber 7 communicating by a connecting gap 17, which becomes narrower and extends between the partition walls 15, 16. The connecting gap 17 is situated above the floor of the container 1 along the entire width of the partition walls 15, 16. On the floor of the settling tank 14 there is an inlet aperture 28 of the air-lift pump 19 for the sucking off and re-circulation of the recycled sludge into the first chamber 6a of the denitrification zone 6. In the settling tank 14 there is a circulation and ventilation system at the level of the water-surface for the treatment of the treated water (in the form of an air-lift pump 20) with two suction inlets 29 (identified in the Figures as 29-29a and 29-29b), which extend at right angles to the water-surface 12 and terminate directly above the water-surface 12 in the settling tank 14 (30). A rectifier plate 31 is installed in the vicinity of the output aperture 30. A discharge line 32 for the treated water is installed in the wall of the reactor shell 2. With regard to the creation of controlled, hydraulic conditions in the settling tank 14, it is advantageous if the connecting gap between the activated chamber and the settling tank 14 gradually narrows in the direction of flow, providing an acceleration of the supply of the effluent-sludge mixture in the direction of the floor of the settling tank 14, the length of the gap, with reference to the avoidance of a turbulent flow, having to be at least four times its inside diameter. The connecting gap between the activated chamber and the settling tank 14 is formed in a very advantageous manner between two inclined partition walls, which partly overlap each other and are set up at various angles relative to the floor of the reactor or to the partition walls in the form of two partially engaging partition walls (in the form of reversed or truncated cones or hemispheres). The lower partition wall operates from the outside as a rectifier of the flow produced by the ventilation of the oxic zone. The connecting gap between the partition walls guides the forced flow of the activated mixture towards the floor of the settling tank 14. In the settling tank 14, at the level of the water-surface, there is a circulation and ventilation system for the treatment of the treated water (in the form of an air-lift pump 20), which system guarantees the sucking-off and the separating of the floating, suspended substances from adhering air bubbles, the ventilation of the treated water zone and the mixing of the chemical precipitants for the sufficient removal of phosphorus. Thus there are two suction inlets 29 (identified in the Figures by 29-29a and 29-29b), which extend at right angles to the water-surface 12 and terminate directly above the water-surface 12 in the settling tank 14 (30). A rectifier plate 31 is installed in the vicinity of the outlet aperture 30, the width of the rectifier plate 31 being selected in such a manner that it guides the flow of the surface layer of the treated water. For the discharge of excess sludge an air-lift pump 21 is installed, which is housed in the nitrification zone 7 and the lower portion of which, which is submerged in the effluent-sludge mixture, is configured in the form of a U. A filtering bag 35 (FIG. 3) is installed in the vicinity of the outlet aperture 34, the filtering bag 35 is accommodated on the bar grate 36 above the settling tank 14. Underneath the bar grate 36 there is a transversely situated collecting plate 37 for the smoothing of the flow of the separated sludge liquor back into the nitrification zone 7. The mixing, the forced circulation, the re-circulation of the effluent-sludge mixture and of the treated water as well as the discharge of the excess sludge are guaranteed by the air-lift pumps 18, 19, 20 and 21. The ventilation and the maintaining of the activated mixture in suspension within the nitrification zone are effected by a ventilating member (with small bubbles) 22 on the floor of the nitrification zone 7. The necessary amount of compressed air is introduced by a blower into every part of the system via conduits (not shown in the Figures), it being possible to regulate the flow of compressed air. The operation of the individual re-circulation and circulation pumps and the ventilation is guaranteed by a control unit (time-switch or microprocessor) and on account of an activation and de-activation logarithm (continuous operation, intermittent operation, discharge of excessive sludge).

The apparatus represented in FIGS. 1, 2, 3 and 4 according to the invention operates as described in the following specification.

The crude effluent runs into the first chamber 5a of the anaerobic fermentation zone 5, a mechanical preliminary treatment taking place by means of the removable device for collecting coarse substances in the effluent 23. The preliminarily treated water is mixed with the re-circulated effluent-sludge mixture from the last chamber 6b of the denitrification zone 6. The hydrodynamic effect of the re-circulated flow of the effluent-sludge mixture disintegrates the coarse substances and guarantees the forced circulation of the effluent-sludge mixture through all chambers of the anaerobic fermentation zone 5 and of the denitrification zone 6 by using the hydrostatic energy of the circulated effluent-sludge mixture and of the re-circulated recycled sludge. The alternating arrangement of the scum boards 3 and overflow barriers 4 provides for an ascending and descending flow of the effluent-sludge mixture and ensures that the activated sludge is kept in suspension and that the content of the anaerobic fermentation zone 5 and that of the denitrification zone 6 are mixed, resulting in the fermentation and dissolving of the easily accessible, organic substances, which are contained in the cells of the bacteria accumulating phosphorus. To avoid sludge deposits on the floor of the chambers, to maintain the sludge in suspension in the chambers and to mix the chambers effectively and avoid the formation of dead times, it is important that the area of the opening between the lower edge of the scum boards, the floor and the shell of the reactor is dimensioned in such a manner that, where there is a minimum through-flow of the re-circulated, activated mixture and of the recycled sludge, the minimum flow rate of the activated mixture of 10 cm/s is maintained on the floor of the chamber and that the ratio between the covered surface area of the chamber and the area of the overflow barrier is at least 1:4. The effluent-sludge mixture flows over the overflow barrier 4-4b into the denitrification zone 6, where it is mixed with the re-circulated recycled sludge from the settling tank 14. Processes of fermentation and the combining of the organic substances in bacteria, which eliminate phosphorus, as well as processes of denitrification and of the dissolving of phosphorus under anaerobic conditions take place in the anaerobic fermentation zone 6 and the denitrification zone 6.

The effluent-sludge mixture from the last chamber 6b of the denitrification zone flows over the overflow barrier 4c into the nitrification zone 7. The overflow of the effluent-sludge mixture from the denitrification zone 6 into the nitrification zone 7 is only active when the crude effluent is supplied into the first chamber 5-5a of the anaerobic fermentation zone 5 or respectively when the recycled sludge is supplied from the settling tank 14 into the first chamber 6-6a of the denitrification zone 6. During the continuous operation, the activation of the sludge, nitrification and the biological combining of phosphorus in the activated sludge and a simultaneous sludge stabilization take place in the nitrification zone 7. In the case of intermittent operation, the process of denitrification dominates. The effluent-sludge mixture from the nitrification zone 7 flows over the connecting gap 17 into the settling tank 14. The suction aperture 28 of the air-lift pump 18 is situated on the floor of the settling tank 14 for the sucking-off and re-circulation of the recycled sludge into the first chamber 6a of the denitrification zone 6, the air-lift pump guaranteeing, through suction, the forced circulation from the nitrification zone 7 into the settling tank 14. The narrowing connecting gap 17 provides for the necessary flow rate as well as for the direction of flow, so as to eliminate the dead zones in the settling tank 14. To increase the efficiency of the separation of the floating, suspended substances from the treated water zone and to avoid uncontrolled denitrification in the settling tank, it is important that a circulating pump is installed in the treated water zone for the circulation and ventilation of the treated water, the suction aperture and outlet of which circulating pump are disposed in the vicinity of the water-surface in the settling tank and it is important for the efficiency of the sucking-off of the floating sewage substances and suspended substances as well as to the efficiency of the decomposition and elimination of the adhering air bubbles, and that the suction aperture of the circulating pump is below the water-surface of the treated water and the outlet aperture is above the water-surface, so that the entire surface of the treated water zone in the settling tank is always circulating. The additional removal of phosphorus can also be effected by a dosing system using liquid chemical precipitants (not shown in the Figures), which dosing system discharges into the piping of the air-lift pump. The removal of excessive sludge and consequently also of the biologically and chemically bound phosphorus is effected automatically at least once a day through the withdrawal of excessive sludge in the oxic state using the air-lift pump 21. The removed excessive sludge is drained in the filtering bag 35, and the separated sludge liquor is brought back into the nitrification zone 7.

The activated sludge method with the removal of nitrogen and phosphorus and the simultaneous stabilization of the sludge for the treatment of effluent according to the invention has the following steps:

The overflow barriers between the anaerobic fermentation zone and the denitrification zone or respectively between the denitrification zone and the nitrification zone have a retaining effect on the activated sludge flocks, when the effluent-sludge mixture flows through them;

The retaining effect of the overflow barriers corresponds to the given structure of the effluent treatment reactor. The inside diameter of the opening between the lower edges of the scum boards and of the reactor floor and the ratio of the covered surface area of the chambers and area of the overflow barriers are influenced by the intensity in the re-circulation of the effluent-sludge mixture into the anaerobic fermentation zone and in the re-circulation of the recycled sludge into the denitrification zone or respectively by a short-term, intermittent operation of the re-circulation;

The residence time and the concentration of the activated sludge in the anaerobic fermentation zone, the denitrification zone, the nitrification zone and the settling tank are automatically controlled within a predetermined time interval by fixed temporal sequences corresponding to the given daily variations in effluent amount and loading; and The method is operated at a mean sludge concentration of 6–8 kg/m$^3$, which is higher than the optimum sludge concentration in the case of known activated sludge methods.

The controlled stay of the activated sludge in non-ventilated zones 5, 6 is represented in the following two examples.

Example No. 1

The effect of the stay of the activated sludge in non-ventilated zones 5, 6 is achieved by alternating continuous blower operation and short-term, intermittent blower operation:

With the air-lift pumps 18, 19 operating continuously and with ventilation, the effluent-sludge mixture overflows into the nitrification zone 7.

During short-term, intermittent operation, the activated sludge is trapped in the anaerobic fermentation zone 5 and in the denitrification zone 6, this also occurs when the air-lift pump 19 is activated in the short-term during the operation, and this is sufficient to shift the activated sludge, which was deposited in the settling tank 14 during the stoppage, in the first chamber 6a of the denitrification zone 6, the short-term mixing effect of the activation of the air-lift pump 19 only being sufficient to raise the sludge clouds in the anaerobic fermentation zone 5 and the denitrification zone 6; and thus effluent with only a little activated sludge overflows, it being possible to alternate the idle phase and the operating phase several times during this operation.

Example No. 2

The effect of the stay of the activated sludge in the non-ventilated zones 5, 6 is achieved by using two blowers—one low-output blower and one high-output blower:

With the air-lift pumps 18, 19 operating and with ventilation through the intermediary of a high-output blower, the effluent-sludge mixture overflows over overflow barriers 4-4b and 4-4c into the nitrification zone 7.

With the air-lift pumps 18, 19 operating and with ventilation through the intermediary of a low-output blower, the activated sludge is trapped in the anaerobic fermentation zone 5 and the denitrification zone 6. The reduced through-flow of the recycled sludge is only enough to raise the sludge cloud in the anaerobic fermentation zone 5 and the denitrification zone 6; at the same time there is a small overflow of the activated sludge over overflow barriers 4-4b and 4-4c, it being possible to alternate between the high-output blower and the low-output blower several times during the day.

The method and the apparatus according to this invention result in numerous advantages. One of the most important advantages is in the adaptation of the daily operation of the reactor to daily variations in effluent production and load, which, apart from the reduction in the energy costs, also guarantees cyclical changes in the sludge concentration in the anaerobic fermentation zone 5, the denitrification zone 6 and the nitrification zone 7.

In the hours in which a higher effluent production is assumed, intermittent operation is activated and the sludge is accumulated in the anaerobic fermentation zone 5 and the denitrification zone 6. In the settling tank 14 there is only treated water with a low sludge level and a small content of suspended substances and sewage substances in the treated water (nitrate, ammonium nitrogen, phosphorus). The in-coming crude effluent drives the treated water out of the reactor as the mixing of the individual zones is restricted. At the same time, a protection from the rush of a larger amount of effluent is achieved. Sewage substances from the crude effluent are trapped for the most part in the denitrification zone 6. The alternating operation and stoppage (de-activation) of the air-lift pumps 18, 19, 20 and 21 and the ventilation are helpful to the rapid sequence of denitrification, nitrification and the biological removal of phosphorus.

In the time in which no effluent supply is assumed, continuous operation is activated and the content of the individual zones is mixed. The sludge concentration in the anaerobic fermentation zone 6, the denitrification zone 6 and the nitrification zone 7 is gradually balanced-out. The complete nitrification and aerobic stabilization of the sludge, together with the activation of the sludge activity, is effected in the nitrification zone 7. In the settling tank 14 there is a higher incidence of the suspended substances, which however do not flow away as no crude effluent is supplied.

The use of the method according to this invention enables a reduction in investment and operating costs for the treatment of effluent, at the same time reducing expenditure made for operators, this individual achievement of effluent treatment being attractive even under conditions in which the effluent treatment, for economical or technical reasons, cannot be effected by discharging effluent into a sewer pipe system and into a central effluent treatment plant.

Another great advantage of the method according to this invention is that the application for the removal of nitrogen and phosphorus from effluent; consequently these treatment plants can also be used for introduction in surface water in regions in which there is the threat of eutrophication of surface water.

The method described in accordance with this invention can also be applied in effluent treatment plants of varying sizes.

What is claimed is:

1. In a method for treatment of effluent with activated sludge in suspension for removal of nitrogen and phosphorus and for simultaneous stabilization of the sludge, including an activated chamber with a non-ventilated, anaerobic fermentation zone and a denitrification zone and a ventilated nitrification zone, the non-ventilated, anaerobic fermentation zone and the denitrification zone of the activated chamber (5, 6) being separated in an alternate manner in a direction of flow by scum boards (3) and overflow barriers (4), giving rise to ascending flow and descending flow chambers in the anaerobic fermentation zone (5) and in the denitrification zone (6), re-circulation of an effluent-sludge mixture from the denitrification zone to the anaerobic fermentation zone, re-circulation of the recycled sludge from the settling tank to the denitrification zone, and detaining effect of the overflow barriers one of between the anaerobic fermentation zone and the denitrification zone and between the denitrification zone and the nitrification zone for activated sludge flocks, when the effluent-sludge mixture flows therethrough, the improvement comprising:

controlling a residence time and a concentration of the activated sludge in the anaerobic fermentation zone, the denitrification zone, the nitrification zone and the settling tank by a change in an intensity of the re-circulation of the effluent-sludge mixture into the anaerobic fermentation zone and the re-circulation of the recycled sludge into the denitrification zone or by alternating the continuous and short-term, intermittent operation of the re-circulation within predetermined time intervals through fixed temporal sequences corresponding to given fluctuations in an amount of effluent and loading.

2. In the method according to claim 1, wherein a mean sludge concentration is 6–8 kg/m$^3$.

3. In an apparatus for treatment of an effluent with an activated sludge in suspension for removal of nitrogen and phosphorus and including simultaneous sludge stabilization, the apparatus comprising: a compact effluent treatment reactor in which an activated chamber and a settlement tank are combined in one internal sludge cycle, the activated chamber containing a non-ventilated, anaerobic fermentation zone and a denitrification zone and a ventilated nitrification zone, the non-ventilated zones of the activated chamber (5, 6) of the reactor being separated in an alternating manner in a direction of flow by scum boards (3) and overflow barriers (4), providing ascending flow and descending flow chambers in the anaerobic fermentation zone (5) and in the denitrification zone (6), at least one inlet aperture (26) of a re-circulation unit (18) included in an end region of the denitrification zone (5) on a reactor floor (1) and an outlet (25) of the re-circulation unit terminating in an initial region of the anaerobic fermentation zone (5), a discharge aperture (27) of an air-lift pump (19) positioned above a level of the water-surface being situated in the first chamber (6a) of the denitrification zone (6) with re-circulated recycled sludge from a floor of the settling tank (14), the recirculated flow of the effluent-sludge mixture and of the recycled sludge and the alternating arrangement of the scum boards (3) and the overflow barriers (4) forming an ascending and descending flow of the effluent-sludge mixture and ensuring that the activated sludge is retained in suspension, and near the opening between the lower edge of the scum boards, the reactor floor and the reactor shell configured so that where there is the minimum flow-through of re-circulated, activated mixture and of recycled sludge a minimum flow rate of the activated mixture of 10 cm/s is retained on a floor of the chamber, and a ratio between the covered surface area of the chamber and the area of the overflow barrier is at least 1:4.

4. In the apparatus according to claim 3, wherein the nitrification zone (7) of the activated chamber communicates with the settling tank (14) via a connecting gap (17) above the reactor floor (1), and the gap extends over an entire width of the partition walls (15, 16) between the nitrification zone (7) of the activated chamber and the settling tank (14).

5. In the apparatus according to claim 4, wherein the scum boards (3) and the overflow barriers (4) define in the direction of flow at least two chambers of the anaerobic fermentation zone (5) and at least two chambers of the denitrification zone (6).

6. In the apparatus according to claim 5, wherein the anaerobic fermentation zone (5) communicates with the denitrification zone (6) via an overflow edge (11) of the overflow barrier (4), and the overflow edge (11) extends in the direction of flow between the anaerobic fermentation zone (5) and the denitrification zone (6).

7. In the apparatus according to claim 6, wherein the denitrification zone (6) communicates with the nitrification zone (7) via the overflow edge (11) of the overflow barrier (4), and the overflow edge (11) extends in the direction of flow between the denitrification zone (6) and the nitrification zone (7).

8. In the apparatus according to claim 7, wherein the re-circulation unit (19) operates according to a principle of the air-lift pump (19).

9. In the apparatus according to claim 8, wherein the initial region of the anaerobic fermentation zone (5) and the end region of the denitrification zone (6) have at least one common partition wall (8).

10. In the apparatus according to claim 3, wherein the scum boards (3) and the overflow barriers (4) define in the direction of flow at least two chambers of the anaerobic fermentation zone (5) and at least two chambers of the denitrification zone (6).

11. In the apparatus according to claim 3, wherein the anaerobic fermentation zone (5) communicates with the denitrification zone (6) via an overflow edge (11) of the overflow barrier (4), and the overflow edge (11) extends in the direction of flow between the anaerobic fermentation zone (5) and the denitrification zone (6).

12. In the apparatus according to claim 3, wherein the denitrification zone (6) communicates with the nitrification zone (7) via the overflow edge (11) of the overflow barrier (4), and the overflow edge (11) extends in the direction of flow between the denitrification zone (6) and the nitrification zone (7).

13. In the apparatus according to claim 3, wherein the re-circulation unit (19) operates according to a principle of the air-lift pump (19).

14. In the apparatus according to claim 3, wherein the initial region of the anaerobic fermentation zone (5) and the end region of the denitrification zone (6) have at least one common partition wall (8).

* * * * *